US006819821B2

(12) United States Patent
Lacey et al.

(10) Patent No.: US 6,819,821 B2
(45) Date of Patent: Nov. 16, 2004

(54) OPTICAL SWITCH WITH A GEOMETRY BASED ON PERPENDICULARLY-ORIENTED PLANAR LIGHTWAVE CIRCUIT SWITCHES

(75) Inventors: Jonathan Lacey, Mountain View, CA (US); Brian Lemoff, Union City, CA (US); Julie Fouquet, Portola Valley, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 110 days.

(21) Appl. No.: 10/108,159
(22) Filed: Mar. 26, 2002
(65) Prior Publication Data US 2003/0185491 A1 Oct. 2, 2003

(51) Int. Cl.[7] .............................. G02B 6/35; G02B 6/28
(52) U.S. Cl. .............................. 385/17; 385/16; 385/24
(58) Field of Search ..................................... 385/16–24

(56) References Cited

U.S. PATENT DOCUMENTS

| | | | | |
|---|---|---|---|---|
| 4,653,850 A | * | 3/1987 | Boirat et al. ................... | 385/17 |
| 5,009,477 A | * | 4/1991 | Alferness et al. ............. | 385/17 |
| 5,729,642 A | * | 3/1998 | Thaniyavarn ................. | 385/17 |
| 5,771,320 A | * | 6/1998 | Stone ........................... | 385/16 |
| 6,181,845 B1 | * | 1/2001 | Horsthuis et al. ............. | 385/17 |
| 6,456,752 B1 | * | 9/2002 | Dragone ....................... | 385/17 |

OTHER PUBLICATIONS

"Compact optical cross–connect switch based on total internal reflection in a fluid–containing planar lightwave circuit," by J. E. Fouquet, paper TuM1, Conference on Optical Fiber Communications, OFC 2000, Baltimore MD, USA, pp. 204–206.

"1296–port MEMS transparent optical crossconnect with 2.07 Petabit/s switch capacity," by R. Ryf et al., paper PD28, Conference on Optical Fiber Communications, OFC 2001, Anaheim CA, USA.

"A study of non–blocking switching networks," Clos. C., Bell System Technical Journal, vol. 32, Mar. 2, 1953, pp. 406–424.

"Low–Loss And High Extinction Ratio Strictly Nonblocking 16/Spl Times/16 Thermooptic Matrix Switch On 6–In Wafer Using Silica–Based Planar Lightwave Circuit Technology," Goh, T.; Yasu, M.; Hattori, K.; Himeno, A.; Okuno, M.; Ohmori, Y., Journal of Lightwave Technology, vol.: 19 Issue: 3, Mar. 2001 pp. 371–379.

* cited by examiner

Primary Examiner—Akm Enayet Ullah
Assistant Examiner—Michelle R. Connelly-Cushwa (57) ABSTRACT

An optical switch has a plurality of input ports and a plurality of output ports. The optical switch features a fan-out fan-in architecture has a fan-out stage, a fan-in stage, and a coupling mechanism. The fan-out stage is coupled to the plurality of input ports and has a first orientation. The fan-in stage is coupled to the plurality of output ports and has a second orientation. The coupling mechanism optically couples the fan-out stage with the fan-in stage and maintains a predetermined relationship between the first orientation of the fan-out stage and the second orientation of the fan-in stage.

20 Claims, 5 Drawing Sheets

OPTICAL SWITCH WITH A GEOMETRY BASED ON PERPENDICULARLY-ORIENTED PLANAR LIGHTWAVE CIRCUIT SWITCHES

FIELD OF THE INVENTION

The present invention relates generally to the switching of optical signals, and more particularly, to an optical switch with a geometry based on perpendicularly oriented planar lightwave circuit switches.

BACKGROUND OF THE INVENTION

There are an ever-growing number of new applications that use high bandwidth digital and analog electro-optic systems. For example, in digital computing systems, electro-optic systems are often utilized to route signals among processors. In analog systems, electro-optic systems are often utilized in applications, such as phased array radar. Electro-optic systems are also commonly found in applications that switch high bandwidth optical carriers in communication systems.

In these systems, light beams are modulated in a digital and/or analog fashion and are used as "optical carriers" of information. There are many reasons why light beams or optical carriers are preferred in these applications. For example, as the data rate required of such channels increases, the high optical frequencies provide a significant improvement in available bandwidth over conventional electrical channels, such as those channels formed by wires and coaxial cables. Moreover, the energy required to drive and carry high bandwidth signals can be reduced at optical frequencies. Furthermore, optical channels (e.g., waveguides and optical fibers) and even those channels propagating in free space can be packed closely and even intersect in space with reduced crosstalk between channels.

An important component in these systems is the optical cross-connect (OXC) switch. Optical crossconnect switches can be divided into two general classes: 1) those with all-optical switch fabrics, and 2) those with optoelectronic switch fabrics. All-optical switch fabrics do not perform any optical-to-electrical conversion of the optical signals to be switched, whereas optoelectronic switches do perform optical-to-electrical conversion of the optical signals to be switched. The lack of electrical conversion allows all-optical switch fabrics to support bit rates (e.g., bit rates in the 40 Gb/s range and higher), which are beyond the reach of most optoelectronic systems. Another advantage of all optical switch fabrics over the optoelectronic switch fabrics is that the all-optical switches are bit rate independent and protocol transparent.

Design Considerations

When designing all-optical switches, a designer considers various design parameters and attempts to optimize these parameters. Some of these key design parameters include, but are not limited to, low insertion loss, low crosstalk, polarization independence, high reliability, compact size, simple operation, low cost, scalability to high port count, and fast switching time.

Crossbar Architecture

Figure 1:
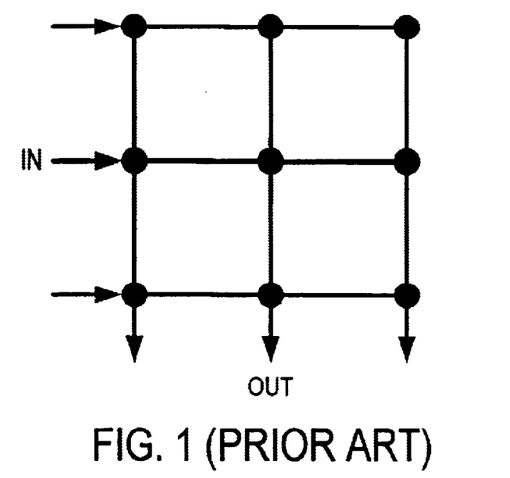
FIG. 1 illustrates a prior art crossbar switch.

FIG. 1 illustrates a prior art switch that employs an architecture that is often referred to as a crossbar architecture. A crossbar switching fabric is constructed by using $N^2$ 1×2 switches, where there is one 1×2 switch at each intersection between an input and an output. In this example, the 3×3 switch has three inputs, three outputs, and a total of nine 1×2 switches in the switching fabric.

Unfortunately, the cross bar architecture has the disadvantage that the insertion loss of the longest path through the switch increases with the number (N) of inputs and outputs. The loss of the shortest path through the switch remains constant with N, so the difference in loss between the shortest and longest path also increases with N.

3D MEMS

Figure 2:
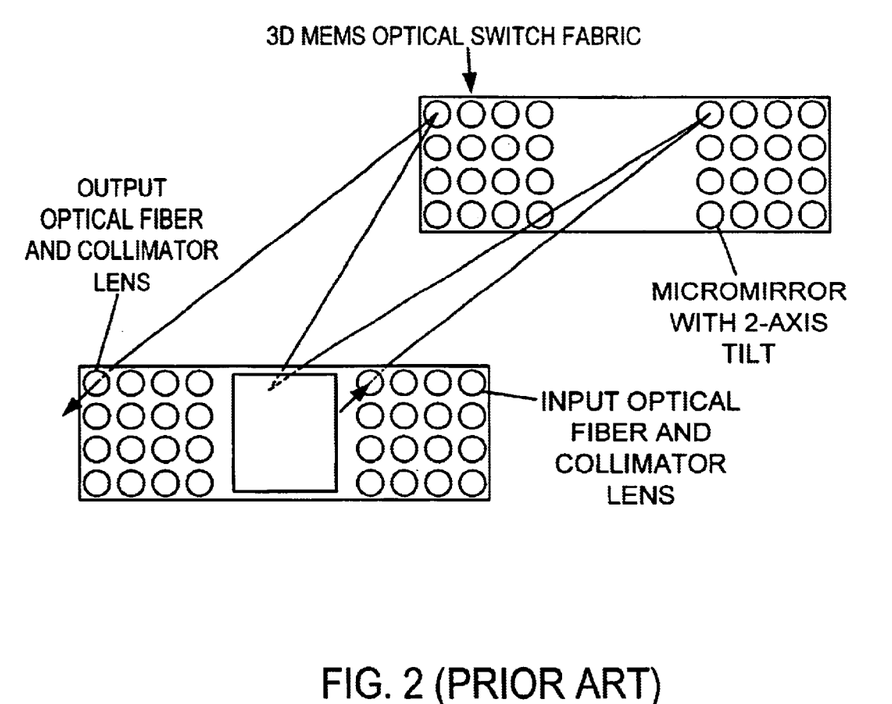
FIG. 2 illustrates a prior art micro-ElectroMechanical Systems (MEMS) switch.

FIG. 2 illustrates a prior art switch matrix that uses a 3-dimensional micro-ElectroMechanical System (3D MEMS). This approach employs micromirror switch elements steerable in an analog fashion in two dimensions. Each micromirror acts as a 1×N switch. An example of this approach is described in "1296-port MEMS transparent optical crossconnect with 2.07 Petabit/s switch capacity," by R. Ryf et al., paper PD28, Conference on Optical Fiber Communications, OFC 2001, Anaheim Calif., USA.

One advantage of this prior art switch is that as N (number of ports) increases, the optical insertion loss of the fabric in general increases only gradually because the loss of the 1×N or N×1 switch increases only gradually with N. Another advantage of this approach is that the interconnection between the input stage of N(1×N) switches and the output stage of N(N×1) switches is performed in free space, thereby avoiding a "fiber jungle" (i.e., the $N^2$ connections between the input and output stages).

One disadvantage of this prior art approach is that a careful and usually expensive mechanical design is necessary to maintain alignment and minimize loss. It is noted that alignment must be maintained even in the face of vibration and temperature variations, which complicates the design. In the 3D MEMS fabric, this disadvantage is amplified by the analog nature of the micromirrors, which are also sensitive to vibration and temperature changes. Typically a large (e.g., greater than 100 ports) 3D MEMS switch requires closed-loop control for each mirror, which, as can be appreciated, increases the cost to manufacture the switch and degrades the reliability of the switch.

Another disadvantage of this prior art approach is that the physical size, complexity, and cost of the fabric increases strongly with N because more ports means that the unguided beam must travel further between input and output. To allow this, the collimated beam must either be re-collimated along its path, thereby requiring that expensive optics be precisely placed to avoid loss; or a larger beam diameter must be used, thereby further increasing the physical size of the fabric.

Consequently, it is desirable for there to be an architecture of an optical switch that simultaneously provides permanent alignment, low loss, compactness and simple interconnect.

Based on the foregoing, there remains a need for an optical switch with a geometry based on perpendicularly-oriented planar lightwave circuit switches that overcomes the disadvantages set forth previously.

SUMMARY OF THE INVENTION

According to one embodiment of the invention, an optical switch that has a plurality of input ports and a plurality of output ports is described. The optical switch features a fan-out in architecture has a fan-out stage, a fan-in stage, and a coupling mechanism. The fan-out stage is coupled to the plurality of input ports and has a first orientation. The fan-in stage is coupled to the plurality of output ports and has a second orientation. The coupling mechanism optically couples the fan-out stage with the fan-in stage and maintains a predetermined relationship between the first orientation of the fan-out stage and the second orientation of the fan-in stage.

According to another embodiment of the invention, an optical switch that has a plurality of input ports and a plurality of output ports is described. The optical switch includes a group of fan-out switches that is coupled to the plurality of input ports and a group of fan-in switches coupled to the plurality of output ports. The fan-out switches are stacked in a first set of planes in a first orientation that is substantially parallel to a first reference plane. The group of fan-in switches is stacked in a second set of planes in a second orientation that is substantially parallel to a second reference plane. The first reference plane is in a predetermined orientation with respect to the second reference plane. For example, the first reference plane may be substantially orthogonal to the second reference plane.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

An optical switch with a geometry that is based on perpendicularly oriented planar lightwave circuit (PLC) switches is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The optical switch of the present invention switches optical signals and may be employed to route optical signals, for example, in optical communication networks and optical signal processing.

Figure 3:
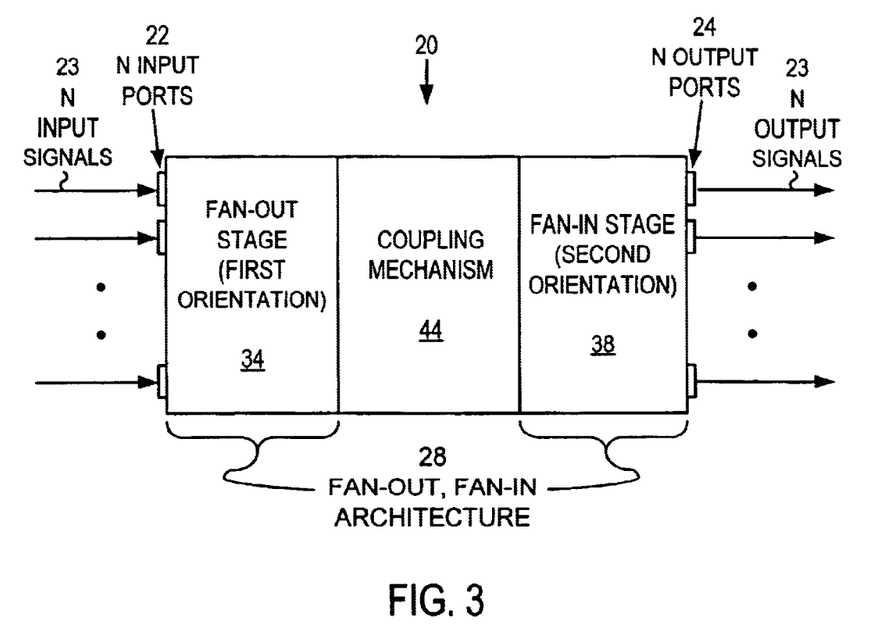
FIG. 3 illustrates an N×N switch in accordance with the invention.

FIG. 3 illustrates an N×N switch 20 in accordance with the invention. The switch includes N input ports 22 for receiving N input signals 23 and N output ports 24 for providing N output signals 25. The switch 20 routes or switches each input signal 23 to a corresponding output signal 25.

The switch 20 includes a fan-out fan-in architecture (FOFIA) 28, which is hereinafter referred also as a 2N(1×N) architecture. The fan-out fan-in architecture (FOFIA) 28 includes a fan-out stage 34 that has a first orientation and a fan-in stage 38 that has a second orientation. The fan-out stage 34 is hereinafter also referred to as the "input stage", and the fan-in stage 38 is hereinafter also referred to as the "output stage." The fan-out stage 34 and the fan-in stage 38 are optically coupled through a coupling mechanism 44. The coupling mechanism 44, for example, can prescribe the first orientation of the fan-in stage 38 and the second orientation of the fan-in stage 38. The coupling mechanism is described in greater detail hereinafter with reference to FIG. 6.

The fan-out stage 34 can include a plurality of fan-out switches that are described in greater detail hereinafter with reference to FIG. 4. The fan-in stage 38 can include a plurality of fan-in switches that are described in greater detail hereinafter with reference to FIG. 4.

Figure 4:
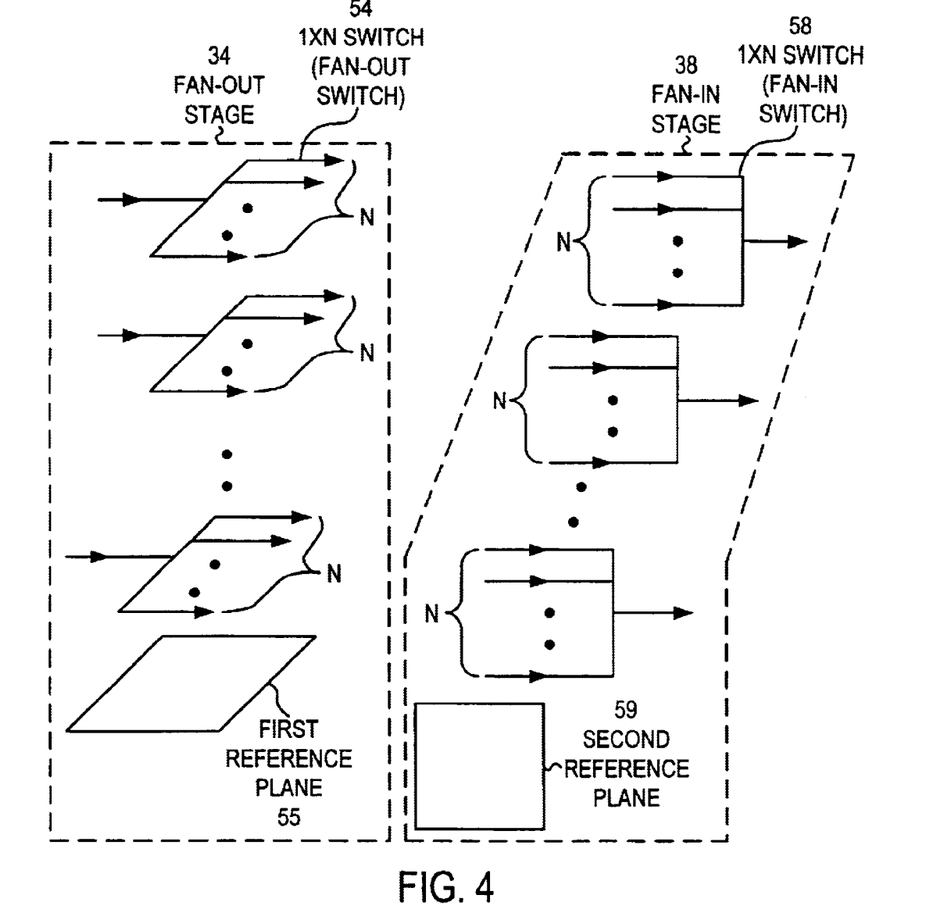
FIG. 4 illustrates in greater detail the N×N switch of FIG. 3.

FIG. 4 illustrates in greater detail the N×N switch of FIG. 3. The fan-out stage 34 can include a plurality of 1×N fan-out switches 54. The N:1×N fan-out switches 54 can be arranged in parallel planes that are substantially parallel to a first reference plane 55. In this example, each plane includes one 1×N switch 54.

The fan-in stage 38 can include a plurality of N×1 fan-in switches 58. The N:N×1 fan-out switches 58 can be arranged in parallel planes that are substantially parallel to a second reference plane 59. In this example, each plane includes one N×1 switch 58.

In one embodiment, the coupling mechanism 44 maintains the N:1×N switches in the fan-out stage 34 in a first orientation that is substantially orthogonal or perpendicular with respect to the second orientation of the N:N×1 switches in the fan-in stage 38.

One advantage of the optical switch in accordance with the invention is that the perpendicular orientation of the input stage 34 with respect to the output stage 38 allows a simple interconnection between stages.

Figure 5:
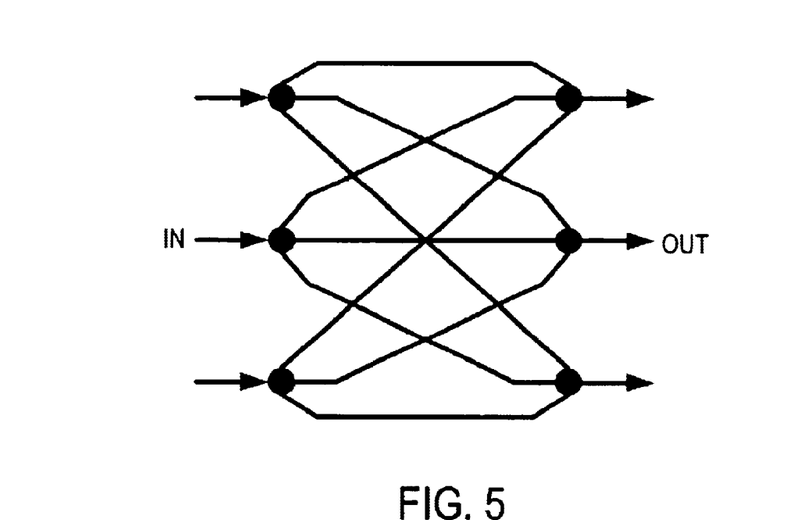
FIG. 5 illustrates an exemplary 3×3 switch that is configured in accordance with the invention.

FIG. 5 illustrates an exemplary 3×3 switch that is configured in accordance with one embodiment of the invention. The optical switch has a 2N(1×N) architecture (with N=3) and includes planar lightwave circuit (PLC) switches in a planar orientation in accordance with one embodiment of the invention. One advantage of this approach over prior art free-space approaches is the permanent alignment offered by the planar lightwave circuit (PLC) switches. The permanent alignment leads to reliability and simplicity since no closed-loop control or complicated assembly is required. Also, because the light is guided, the required beam diameter and hence the physical size of the fabric does not increase dramatically with N.

As N increases, the $N^2$ connections between the input and output stages lead to a "jungle" of fibers or waveguides in the center of the switch. These connections are physically large and lossy when implemented with planar waveguides or large and fragile when implemented with fibers. The optical switch in accordance with another embodiment of the invention, as illustrated in FIGS. 6 and 7, solves this problem of a jungle of fibers or waveguides, especially for switches with large N.

Figure 6:
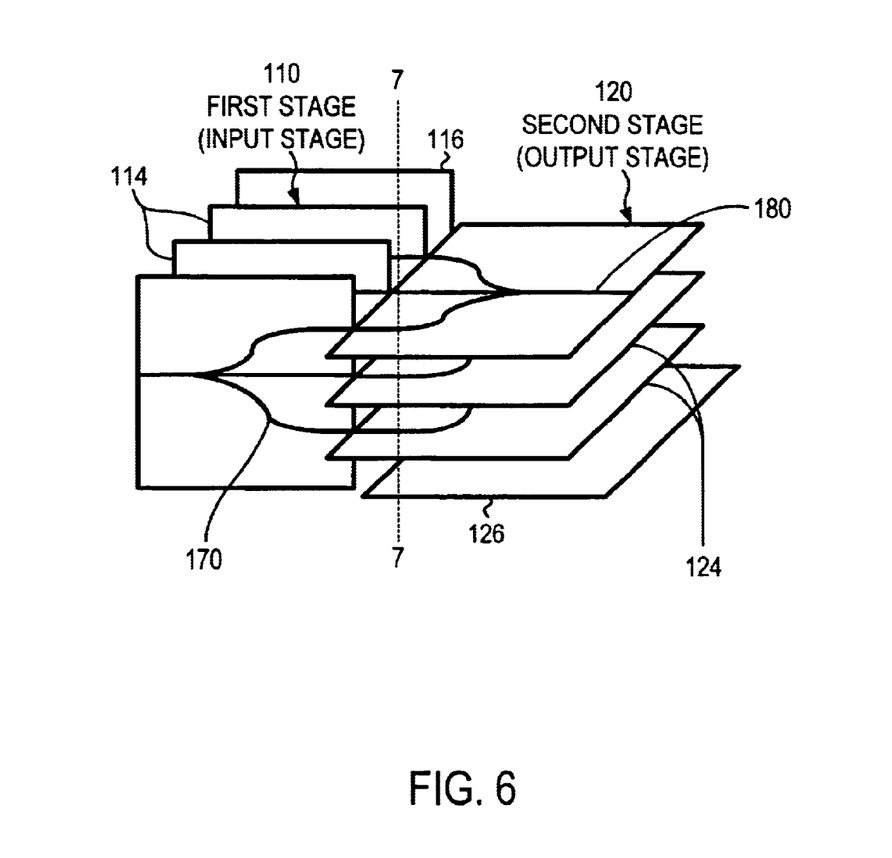
FIG. 6 illustrates a first geometry for an optical switch based on perpendicularly oriented planar lightwave circuit switches in accordance with one embodiment of the invention.
Figure 7:
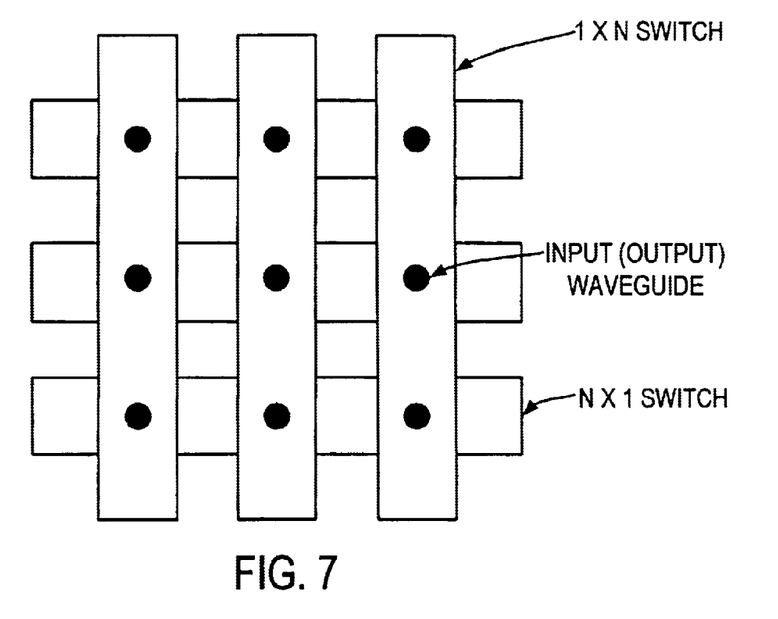
FIG. 7 illustrates a cross-sectional view of the optical switch of FIG. 6 through line 7—7.

FIG. 6 illustrates an optical switch 100 with a geometry based on perpendicularly oriented planar lightwave circuit (PLC) switches in accordance with one embodiment of the invention. In this embodiment, the optical switch 100 includes a N×N switch matrix. The optical switch utilizes an 2N(1×N) architecture.

The optical switch 100 includes a first stage 110 (also referred to herein as an input stage) and a second stage 120 (also referred to herein as an output stage). The first stage 110 includes a plurality of planes 114 that have a first orientation. For example, the planes 114 are parallel to a first reference plane 116. each plane 114 includes a fan-out switch 170 (e.g., a 1×N switch).

The second stage 120 includes a plurality of planes 124 that have a second orientation. For example, the planes 124 are parallel to a second reference plane 126. Each plane 124 includes a fan-in switch 180 (e.g., a N×1 switch).

In this example, the planes 114 are oriented at an angle to (e.g., perpendicular to or orthogonal to) the planes 124. For example, the planes 114 can be substantially perpendicular to the planes 124.

For example, the first stage 110 can include one or more 1×N input switches (e.g., a first group of N:1×N fan-out switches) that are disposed parallel to the first reference plane 116. Similarly, the second stage 120 can include one or more N×1 output switches (e.g., a second group of N:N×1 fan-in switches) that are disposed parallel to the second reference plane 126. In this example, the first reference plane 116 is generally orthogonal to the second reference plane 126. In this manner, the fan-out switches in the first group are configured in a perpendicular fashion with respect to the fan-in switches in the second group.

The fan-out fan-in architecture (also referred to as an 2N(1×N) architecture) in accordance with the invention uses a 1×N switch for each input and an N×1 switch for each output. Each input switch is connected to every output switch. In this example, there is a single switch per plane.

In one embodiment, the fan-out switches and fan-in switches are planar lightwave circuits (PLCs). For example, each 1×N switch and N×1 switch may be implemented with a planar lightwave circuit (PLC). Since PLCs provide a guided-wave approach, the optical switch in accordance with the invention that uses PLCs has the advantage of permanent alignment of inputs to outputs. In order to maintain low insertion loss despite changes in temperature and vibration, it is sufficient to ensure that the input fibers and output fibers stay in place. Consequently, the optical and mechanical design of the optical switch in accordance with the invention is relatively simple and cost-effective to implement.

As described in greater detail hereinafter with reference to FIG. 8, each N×1 switch or 1×N switch can be implemented as a tree of 1×2 switch elements.

FIG. 7 illustrates a cross-sectional view of the optical switch of FIG. 6 through line 7—7. Specifically, FIG. 7 illustrates a cross-sectional view through the intersection between the first and second stages along with line 7—7. Output waveguides from the 1×N (input-stage) switches align directly with input guides to the N×1 (output-stage) switches. In the preferred implementation, the first stage 110 and the second stage 120 are butt-coupled directly to one another. Alignment tolerances for this coupling can be relaxed by tapering the ends of the waveguides so that they are large at the intersection.

Figure 8:
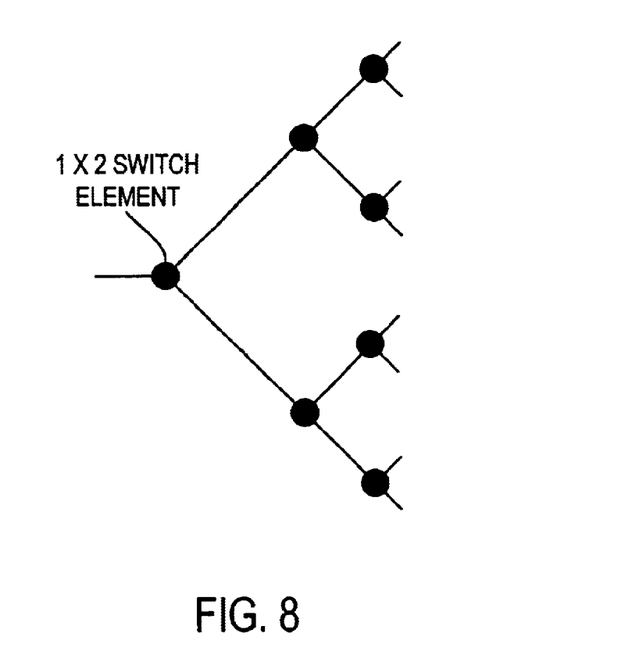
FIG. 8 illustrates an exemplary implementation of a 1×N switch as a tree of 1×2 switch elements in accordance with the invention.

FIG. 8 illustrates an exemplary implementation of a 1N fan-out switch as a tree of 1×2 switch elements in accordance with one embodiment of the present invention. In a similar fashion, a N×1 fan-in switch may be implemented as a tree of 2×1 switch elements. By employing simple 1×2 switches as a basic building block for building the optical switch in accordance with the invention, several benefits are realized. One benefit of the tree approach over the prior art crossbar approach is that, in the tree, only $2\log_2 N$ 1×2 switches are seen by each signal. Consequently, the insertion loss scales better with N for the optical switch in accordance with the invention. Furthermore, since this loss is seen by every signal, there is no path-dependent loss variation for the optical switch in accordance with the invention.

The fan-in switches and fan-out switches can employ bubble technology or a thermo-optic technology. In one embodiment of the invention, the fan-out switches and fan-in switches utilize bubble technology and are implemented in a fluid-containing planar lightwave circuit (PLC) that employs total internal reflection therein. This embodiment features simple, binary control, very low crosstalk, fast switching time, low polarization-dependence, and compact design.

An optical cross-connect (OXC) switch that employs bubble technology is based on the total internal reflection from the sidewalls of trenches etched at the crosspoints of a silica planar lightwave circuit (PLC) matrix. The trenches are normally filled with a refractive index-matching fluid to allow transmission across the trench to the next collinear waveguide segment in the waveguide chip. Most of the light propagation distance occurs in waveguides. The trenches are only approximately 15 microns in width, so the unguided propagation is short and has the added advantage of a higher refractive index than free space.

In this manner, large port count switches can be built with fairly low insertion loss. The liquid is displaced using a small bubble, which is generated at the crosspoint by an inkjet technology-based thermal actuator, which may be fabricated on a separate chip that is bonded to the waveguide. In the presence of a bubble, light undergoes total internal reflection. Holes penetrate the actuator chip on either side of each crosspoint to accommodate expansion and contraction of the bubble.

The advantages of utilizing bubble technology include, but are not limited to, simple, binary control (i.e., the bubble is either present or absent), very low crosstalk, fast switching time (e.g., in the millisecond range), suitable for many optical networking applications, low polarization-dependence, and compact design.

An example of a PLC switch element that can be used to construct the optical switch in accordance with the invention and a further description related to bubble technology are described in the publication entitled, "Compact optical cross-connect switch based on total internal reflection in a fluid-containing planar lightwave circuit," Fouquet, J. E., Optical Fiber Communication Conference, 2000, Volume: 1, 2000, Page(s): 204–206, which is hereby incorporated by reference.

In an alternative embodiment, the fan-out switches and fan-in switches are implemented by utilizing thermo-optic technology. The thermo-optic technology employs double Mach-Zehnder interferometer switches at each crosspoint to improve extinction for the switch, but at the cost of a large area requirement. Thermo-optic technology is further described in a publication entitled, "Low Loss And High Extinction Ratio Strictly Nonblocking 16/Spl Times/16 Thermooptic Matrix Switch On 6-In Wafer Using Silica-Based Planar Lightwave Circuit Technology," Goh, T.; Yasu, M.; Hattori, K.; Himeno, A.; Okuno, M.; Ohmori, Y., Journal of Lightwave Technology, Volume: 19 Issue: 3, March 2001 Page(s): 371–379, which is hereby incorporated by reference.

An important aspect of the present invention is the geometry of the interconnection between the input stage 110 and the output stage 120. Functionally, the interconnect is configured so that each 1×N switch in the input stage is connected to every N×1 switch in the output stage. The geometry specified by optical switch in accordance with the invention places the input and output switches in orthogonal planes, thereby allowing the interconnect to be implemented in a simple yet reliable manner. It is noted that the optical switch illustrated in FIGS. 6 and 7 may be implemented more simply than the switch illustrated in FIG. 5, especially for large N.

The optical switch of the present invention features the advantages of 1) permanent alignment and compactness offered by planar lightwave circuit (PLC) optical switches, 2) low loss offered by the fan-out fan-in architecture of the switches (i.e., the 2N(1×N) architecture), and 3) a simple interconnect offered by orthogonal orientation of the input and output stages. Specifically, the fan-out fan-in architecture offers low insertion loss and relatively small physical size even as the number of input ports and output posts increase. Since the optical switch in accordance with the invention employ PLC switches that features permanent alignment, the optical switch in more simple in design and more reliable in operation than prior art "free-space" approaches.

The optical switch in accordance with the invention can be utilized, for example, in systems and networks that employ time-division multiplexing (TDM), wavelength-division multiplexing (WDM), and dense wavelength division multiplexing (DWDM).

The optical switch in accordance with the invention can also be utilized for application that require high port count. For example, the optical switch in accordance with the invention is suitable for applications that require large switch fabrics (e.g., a 512×512 fabric) in a strictly non-blocking architecture.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. An optical switch comprising:
a) a plurality of input ports;
b) a plurality of output ports;
c) a fan-out fan-in architecture;
wherein the fan-out fan-in architecture includes
a fan-out stage coupled to the plurality of inputs ports that has a first orientation;
output waveguides coupled to the fan-out stage, each of the output waveguides having a tapered end;
a fan-in stage coupled to the plurality of output ports that has a second orientation;
input waveguides coupled to the fan-in stage, each of the input waveguides having a tapered end; and
a coupling mechanism for optically coupling the tapered end of each of the output waveguides with the tapered end of a corresponding one of the input waveguides and for maintaining a predetermined relationship between the first orientation of the fan-out stage and the second orientation of the fan-in stage.

2. The optical switch of claim 1 wherein the fan-out stage includes a plurality of fan-out switches that is disposed in a first set of substantially parallel planes; and wherein there is one fan-out switch per input port.

3. The optical switch of claim 1 wherein each fan-out switch is a 1×N switch and wherein each fan-out switch includes an input coupled to one of the plurality of input ports and N outputs for coupling to the fan-in stage.

4. The optical switch of claim 1 wherein there is one fan-out switch per plane; and wherein the fan-out switches are planar lightwave circuits (PLCs).

5. The optical switch of claim 1 wherein the fan-in stage includes a plurality of fan-in switches that is disposed in a second set of substantially parallel planes; and wherein there is one fan-in switch per output port.

6. The optical switch of claim 5 wherein there is one fan-in switch per plane; and wherein the fan-in switches are planar lightwave circuits (PLCs).

7. The optical switch of claim 1 wherein each fan-in switch is a N×1 switch; and wherein each fan-in switch includes N inputs for coupling to the fan-out stage and an output coupled to one of the plurality of output ports.

8. The optical switch of claim 1 wherein the fan-out fan-in architecture is a 2N(1×N) architecture; wherein N is the number of input ports; and wherein N is the number of output ports.

9. The optical switch of claim 1 wherein the fan-out stage includes a plurality of 1×N fan-out switches stacked in a first set of planes that are arranged in a substantially parallel fashion;
wherein the fan-in stage includes a plurality of N×1 output switches stacked in a second set of planes that are arranged in a substantially parallel fashion; and
wherein the coupling mechanism optically couples the plurality of 1×N fan-out switches with the plurality of N×1 fan-in switches and maintains the first set of planes substantially orthogonal to the second set of planes.

10. The optical switch of claim 1 wherein the fan-out stage includes a plurality of fan-out switches; wherein the fan-in stage includes a plurality of fan-in switches; and wherein the fan-out switches and fan-in switches are non-blocking.

11. The optical switch of claim 1 wherein the fan-out stage includes a plurality of 1×N fan-out switches; wherein the fan-in stage includes a plurality of N×1 fan-in switches; wherein 1×N fan-out switch is implemented with a tree of 1×2 switches; and wherein each N×1 switch is implemented with a tree of 2×1 switches.

12. The optical switch of claim 1 wherein the fan-out stage includes a plurality of fan-out switches; wherein the fan-in stage includes a plurality of fan-in switches; wherein the fan-out switches and fan-in switches are implemented by one of a bubble technology and a thermo-optic technology.

13. An optical switch comprising:
a) a plurality of input ports;
b) a plurality of output ports;
c) a group of fan-out switches coupled to the plurality of input ports;
wherein the fan-out switches are stacked in a first set of planes in a first orientation that is substantially parallel to a first reference plane, and wherein each of the fan-out switches has an output waveguide coupled thereto, each of the output waveguides having a tapered end; and
d) a group of fan-in switches coupled to the plurality of output ports;
wherein the group of fan-in switches are stacked in a second set of planes in a second orientation that is substantially parallel to a second reference plane, and wherein each of the fan-in switches has an input waveguide coupled thereto, each of the input waveguides having a tapered end coupled to the tapered end of a corresponding one of the output waveguides;

wherein the first reference plane is in a predetermined orientation with respect to the second reference plane.

14. The optical switch of claim 13 wherein the first reference plane is substantially orthogonal to the second reference plane.

15. The optical switch of claim 13 wherein the fan-in switches are planar lightwave circuits (PLCs); and wherein the fan-out switches are planar lightwave circuits (PLCs).

16. The optical switch of claim 13 wherein the fan-out switches are 1×N switches.

17. The optical switch of claim 16 wherein the fan-in switches are N×1 switches.

18. The optical switch of claim 17 wherein each N×1 switch is implemented with a tree of 2×1 switch elements; and wherein each 1×N switch is implemented with a tree of 1×2 switch elements.

19. The optical switch of claim 13 wherein the optical switch includes a 2N(1×N) architecture; and wherein the fan-out switches and fan-in switches are nonblocking.

20. The optical switch of claim 13 wherein each fan-out switch is implemented by one of a bubble technology and a thermo-optic technology; and wherein each fan-in switch is implemented by one of a bubble technology and a thermo-optic technology.

* * * * *